United States Patent

[11] 3,542,148

| [72] | Inventor | Kenneth A. Wilson<br>Locust Valley, New York |
|---|---|---|
| [21] | Appl. No. | 680,181 |
| [22] | Filed | Nov. 2, 1967 |
| [45] | Patented | Nov. 24, 1970 |
| [73] | Assignee | American Chain and Cable Company, Inc.<br>New York, New York<br>a corporation of New York. by mesne assignments |

[54] SPEED CONTROL FOR UNMANNED VEHICLES
5 Claims, 5 Drawing Figs.
[52] U.S. Cl. .................................................. 180/105,
180/98; 246/182; 317/5
[51] Int. Cl. .................................................. B60k 31/00
[50] Field of Search .................................................. 180/105-
—110, 98; 317/5; 318/310—314, 318, 328, 341;
307/234, 233; 328/72, 74; 180/98; 246/182, 63, 186

[56] References Cited
UNITED STATES PATENTS

| 2,332,584 | 11/1967 | McCune | 180/98UX |
|---|---|---|---|
| 2,719,912 | 10/1955 | Maenpaa et al. | 180/105X |
| 2,932,778 | 4/1960 | Curtis | 318/318X |
| 3,146,432 | 8/1964 | Johnson | 307/233UX |
| 3,244,985 | 4/1966 | Turecki | 328/74 |
| 3,247,491 | 4/1966 | DuVall | 307/234X |
| 3,340,951 | 9/1967 | Vitt | 180/106 |
| 3,346,771 | 10/1967 | Sutton | 317/5 |
| 2,332,584 | 11/1967 | McCune | 180/98UX |

Primary Examiner—Kenneth H. Betts
Attorney—Barnes, Kisselle, Raisch & Choate

ABSTRACT: The vehicle disclosed herein is of the type which is unmanned and is adapted to follow a predetermined path such as a wire embedded in the floor. The vehicle includes a brake circuit which is actuated when the speed of the vehicle exceeds a predetermined value to retard the movement of the vehicle. Magnets are placed on a nontractive wheel of the vehicle and the time interval between successive magnets moving past a sensing device is compared with a predetermined standard to produce the brake energizing signal. The brake is energized for a predetermined time interval which slows the vehicle down. Should the vehicle again exceed the predetermined value the brake will again be energized for the predetermined value.

Patented Nov. 24, 1970

3,542,148

INVENTOR.
KENNETH A. WILSON
BY
Barnes, Kisselle, Raisch & Choate
ATTORNEYS

INVENTOR.
KENNETH A. WILSON

SPEED CONTROL FOR UNMANNED VEHICLES

BACKGROUND OF THE INVENTION

This invention relates to speed control of vehicles and particularly to the speed control of unmanned vehicles such as vehicles which follow a predetermined path embedded in the floor.

It is well know to provide unmanned vehicles that follow a path along the floor which may be defined, for example, by a wire embedded in the floor. In such vehicles, it is desirable to monitor and control the speed of the vehicle especially in areas of downgrade to prevent loss of control and resultant accidents. Heretofore such speed control has been achieved by having an external signal delivered to the vehicles as the vehicles approaches the area of speed control such as a down ramp to actuate a speed control mechanism or to reduce the power supplied to the vehicle's motor and thereby retard its speed.

Among the objects of the invention are to provide a speed control mechanism for unmanned vehicles which is entirely within the vehicle; which operates to actuate a speed retarding mechanism such as a brake; which is successively operable for a predetermined time interval to retard the speed of the vehicle.

DESCRIPTION

Figure 1:
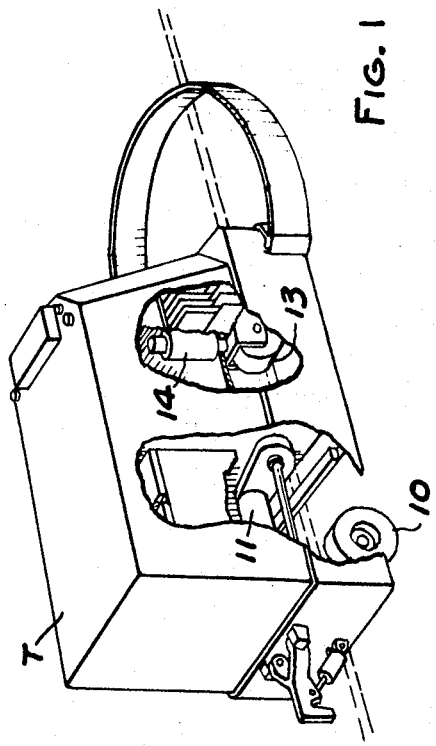
FIG. 1 is a part sectional partly diagrammatic prospective view of the vehicle embodying the invention.

Referring to FIG. 1, the vehicle T to which the invention is directed may comprise a tractor provided with rear-drive wheels 10 that are driven by a motor 11 and a front dirigible style steering wheel 13 that is steered by a steering motor 14. A control system is provided on the vehicle which senses the guide path and produces an appropriate steering signal as is well know in the art to steer the vehicle along a predetermined guide path.

In accordance with the invention, a brake is provided on the vehicle which is energized at predetermined intervals of time when the speed of the vehicle exceeds a predetermined value.

Figure 3:
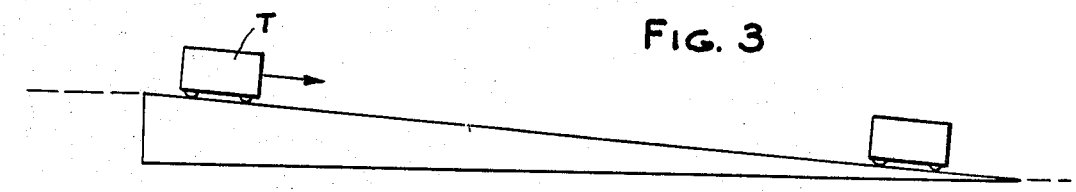
FIG. 3 is a diagram showing the problem to which the invention is directed.

The problem to which the invention is directed may be more readily understood by reference to the diagram shown in FIG. 3 wherein it can be seen that the vehicle moving downwardly along the ramp accelerates. It is desirable to control the speed by braking the vehicle in some manner.

Figure 2:
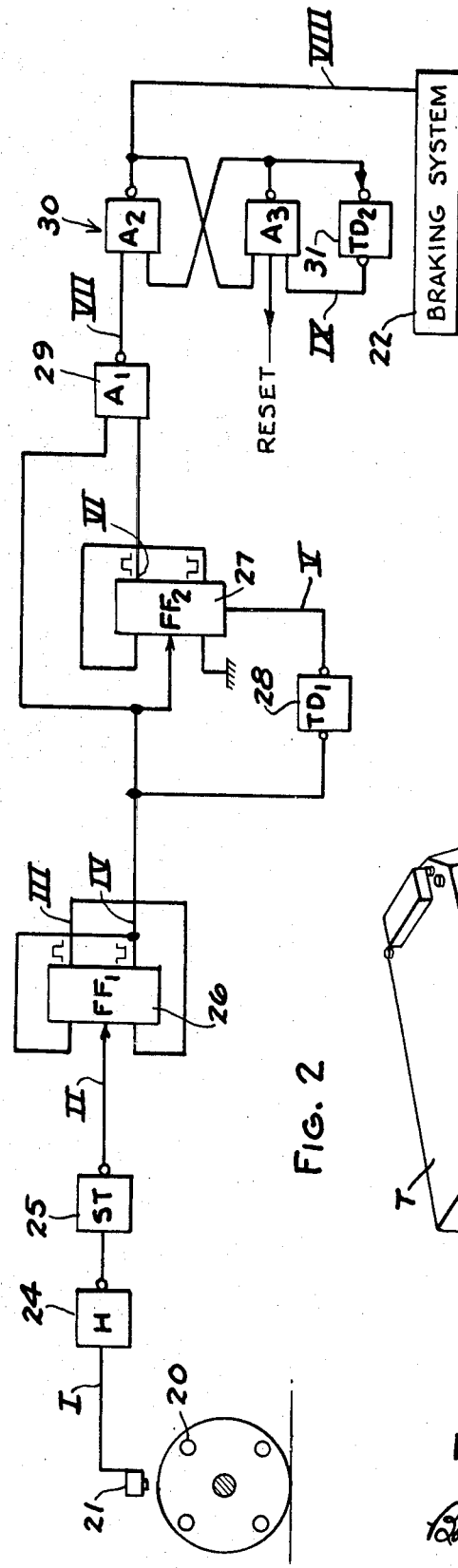
FIG. 2 is a schematic wiring diagram of the invention.

Referring to FIG. 2, a nontractive wheel of the vehicle such as the steering wheel 13 is provided with circumferentially spaced magnets 20. As the vehicle is moved along, the time interval between the magnets 20 is sensed by sensing means 21 such as an electromagnetic coil producing pulses. In accordance with the invention, the time interval between the pulses is compared with a standard and when the time interval is less than the time interval of a standard, a braking or speed retarding signal is produced that actuates the braking system 22. It can be understood that the braking system may comprise a conventional mechanical brake, electric brake, hydraulic brake or some other means for controlling the motion of the vehicle.

Referring to FIG. 2, the pulses emanating from the sensor 21 are filtered by a filter 24 and shaped by a Schmitt trigger 25 and thereafter applied to a binary flip-flop 26. One of the outputs of the binary is connected to a flip-flop 27 and a time delay 28. The output of flip-flop 26 is also connected to "and" gate 29 which receives another input from flip-flop 27. The output of the "and" gate 29 extends to flip-flop 30 which has a time delay 31 associated therewith for reasons presently described. The manner in which the circuit operates to produce the desired result can be more readily understood by reference to the pulse diagram shown in FIG. 4.

As seen in pulse diagram I, the pulses at point I comprise unshaped pulses, the time interval between the pulses corresponding to the speed of the vehicles. The pulses are filtered and shaped by the filter 24 and Schmitt trigger 25 so that the signal at point II comprises a plurality of sharp pulses, the time interval between the pulses corresponding to the speed of the vehicle. The successive pulses passing to flip-flop 26 produce oppositely directed pulses at the two output stages thereof as shown in pulse diagrams III and IV. Specifically when point III is gated on, point IV is gated off and vice versa.

When point IV is gated off, flip-flop 27 is triggered on. Also the time delay 28 is active during the time that output IV of the flip-flop 26 is off. After a predetermined time interval, time delay 28 produces a pulse on line V which turns off point VI of flip-flop 27. This condition is represented by the time interval $t_1$ in FIG. 4.

Figure 4:
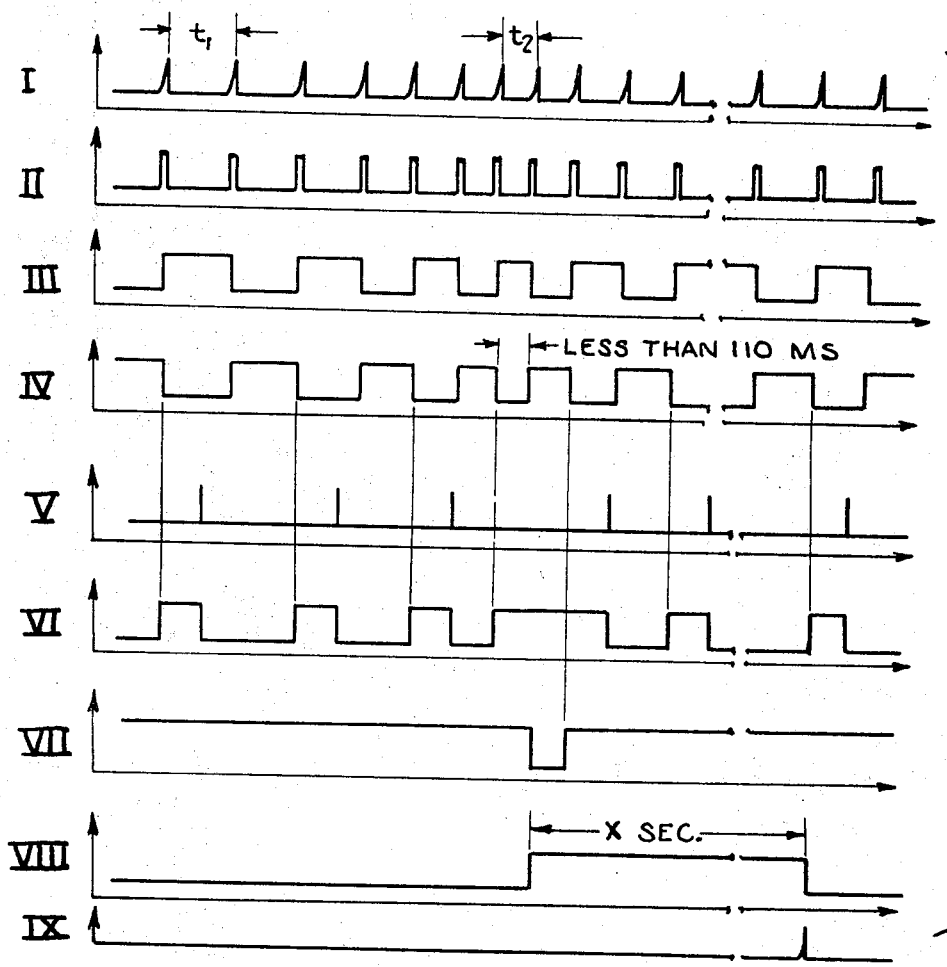
FIG. 4 is a pulse diagram showing the electrical pulses in various portions of the circuit.

If, however, the time interval $t$ between the pulses is less than the time interval of the time delay 28, then line IV will cause time delay 28 to become inactive before producing a reset pulse thereby allowing flip-flop 27, line VI to remain on during the portion that flip-flop 26, line IV is on. When both line IV and VI are on, the "and" gate 29 is caused to produce a signal on line VII as shown in FIG. 4. This signal on line VII turns on flip-flop 30 producing a speed control signal as shown in line VIII. The time delay 31 associated with the flip-flop 30 serves to reset the flip-flop 30 after a predetermined time delay, for example, five seconds. Thus, after a predetermined time delay, the output signal is interrupted and the vehicle is returned to normal operation.

Figure 5:
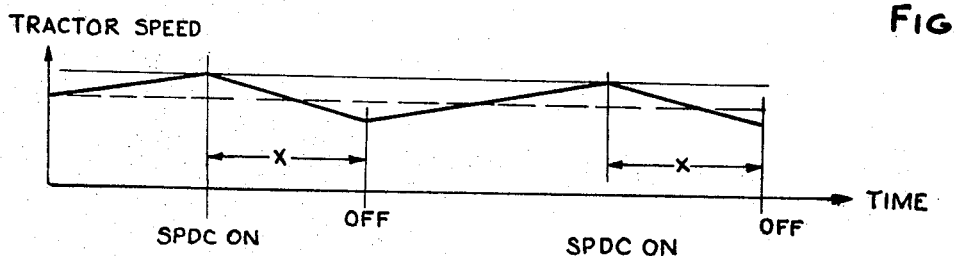
FIG. 5 is a curve showing the manner in which the speed of the vehicle is controlled.

The manner in which the system operates to control the speed of the vehicle is shown diagrammatically in FIG. 5 wherein it can be seen that when the speed exceeds a predetermined value, the brake is applied to retard the signal for a predetermined interval of $x$ seconds. The brake is then released and if the vehicle continues to be on the downgrade, its speed accelerates, and when the speed passes the predetermined maximum, the brake is again actuated to retard the speed for a predetermined interval of time $x$. This occurs in successive increments until the reaccelerated speed of the vehicle does not exceed the man maximum predetermined speed that is set into the system.

I claim:

1. The method of controlling the speed of a vehicle having brake means thereon which comprises:
   producing a plurality of pulses spaced in time an interval proportional to the speed of the vehicle;
   causing each successive pulse to change the state of a first flip-flop;
   causing each alternate pulse to initiate a predetermined time delay;
   causing said time delay to control the state of a second flip-flop; and
   producing a correction signal when the time interval between the change of state of said first flip-flop and said time delay is less than the time interval of said time delay.

2. The method set forth in claim 1 including the step of initiating a second time delay upon creation of said speed retarding signal and causing said second time delay to interrupt said speed retarding signal after a predetermined time operation of said second time delay.

3. The combination of comprising:
   brake means on the vehicle;
   means for producing successive pulses having a time interval proportional to the speed of the vehicle;
   means for comparing said time interval between said pulses with a predetermined standard;
   means for producing a speed retarding signal for actuating said brake when the time interval between said first-mentioned pulses is less than the time interval of said standard;

said last-mentioned means comprising a first flip-flop initiated by said successive pulses;
a time delay means initiated by said successive pulses;
a second flip-flop actuated by said time delay or by said first flip-flop whereby if said state of said first flip-flop is changed during a time interval greater than the time delay of said time delay means, said second flip-flop is controlled by said time delay means, said second flip-flop time delay means initiated by successive pulses;
control pulse means initiated by said time delay means; and
means actuated when the length of said control pulses is less than the time delay to produce said speed restraining signal.

4. The combination set forth in claim 3 including a second time delay means operable to control the length of said retarding signal.

5. The method of controlling the speed of a vehicle having speed retarding means thereon which comprises:
producing a plurality of pulses spaced in time an interval proportional to the speed of the vehicle;
comparing the time interval between alternate pulses with a predetermined time interval;
creating a speed retarding signal when the time interval of said first-mentioned pulses is less than said predetermined time interval;
actuating said speed retarding means in response to said signal; and
interrupting said speed retarding means after a first predetermined time interval and reinitiating said speed retarding means after a second time interval if the speed has not been reduced to said predetermined time interval.